United States Patent
Park et al.

(10) Patent No.: US 11,276,864 B2
(45) Date of Patent: Mar. 15, 2022

(54) CARTRIDGE FOR FIRING

(71) Applicant: LG CHEM, LTD., Seoul (KR)

(72) Inventors: Eun Yong Park, Daejeon (KR); Doyeon Jeon, Daejeon (KR); Jong Seol Yoon, Daejeon (KR); Kwangwook Choi, Daejeon (KR); Dong Oh Shin, Daejeon (KR); Jiyeon Kim, Daejeon (KR)

(73) Assignee: LG CHEM, LTD.

( * ) Notice: Subject to any disclaimer, the term of this patent is extended or adjusted under 35 U.S.C. 154(b) by 56 days.

(21) Appl. No.: 15/733,336

(22) PCT Filed: Mar. 22, 2019

(86) PCT No.: PCT/KR2019/003370
§ 371 (c)(1),
(2) Date: Jul. 1, 2020

(87) PCT Pub. No.: WO2019/203462
PCT Pub. Date: Oct. 24, 2019

(65) Prior Publication Data
US 2021/0119223 A1 Apr. 22, 2021

(30) Foreign Application Priority Data

Apr. 18, 2018 (KR) .................. 10-2018-0044896

(51) Int. Cl.
*H01M 4/00* (2006.01)
*H01M 4/88* (2006.01)
(Continued)

(52) U.S. Cl.
CPC ......... *H01M 4/8885* (2013.01); *H01M 8/122* (2013.01); *H01M 2008/1293* (2013.01)

(58) Field of Classification Search
CPC ....... H01M 2008/1293; H01M 4/8885; H01M 8/122; F27D 5/00; Y02E 60/50
See application file for complete search history.

(56) References Cited

U.S. PATENT DOCUMENTS 7,976,980 B2   7/2011   Yoon et al.
8,603,696 B2  12/2013   Ohmori et al.
(Continued)

FOREIGN PATENT DOCUMENTS

JP    H09241079 A     9/1997
JP    2006-331977    12/2006
(Continued)

OTHER PUBLICATIONS

International Search Report corresponding to PCT/KR2019/003370; dated Jul. 3, 2019 (5 pages, including English translation).

*Primary Examiner* — Cynthia H Kelly
*Assistant Examiner* — Monique M Wills
(74) *Attorney, Agent, or Firm* — Myers Bigel, P.A.

(57) ABSTRACT

The present invention relates to a firing cartridge, and more particularly, to a firing cartridge in which multiple slit grooves are formed in lateral portions positioned between an upper end portion and a lower end portion, and solid fuel cell electrodes are inserted into the slit grooves, such that the number of cells, which may be fired at the same time, is increased, and thus productivity of a solid fuel cell may be improved.

16 Claims, 2 Drawing Sheets

(51) Int. Cl.
*H01M 8/122* (2016.01)
*H01M 8/12* (2016.01)

(56) References Cited

U.S. PATENT DOCUMENTS

| | | | |
|---|---|---|---|
| 2007/0281208 | A1 | 12/2007 | Yoon et al. |
| 2011/0117457 | A1* | 5/2011 | Nakamura ........ H01M 8/04014 |
| | | | 429/408 |
| 2013/0216927 | A1 | 8/2013 | Gottmann et al. |
| 2016/0211542 | A1 | 7/2016 | Nishihara et al. |
| 2018/0026320 | A1* | 1/2018 | Poirier .............. H01M 10/6553 |
| | | | 429/100 |

FOREIGN PATENT DOCUMENTS

| | | |
|---|---|---|
| JP | 2009-238431 | 10/2009 |
| JP | 2010215287 A | 9/2010 |
| JP | 5255327 | 8/2013 |
| JP | 2015-022844 | 2/2015 |
| KR | 1020040014350 | 2/2004 |
| KR | 1020060084887 | 7/2006 |
| KR | 101199846 | 11/2012 |
| KR | 1020160033757 | 3/2016 |
| KR | 101655067 | 9/2016 |
| KR | 1020160122954 | 10/2016 |
| WO | 2012014835 A1 | 2/2012 |

* cited by examiner

CARTRIDGE FOR FIRING

CROSS REFERENCE TO RELATED APPLICATIONS

This application is a 35 U.S.C. § 371 national stage application of PCT International Application No. PCT/KR2019/003370, filed Mar. 22, 2019, which claims priority from Korean Patent Application No. 10-2018-0044896, filed Apr. 18, 2018, the contents of which are incorporated herein in their entireties by reference. The above-referenced PCT International Application was published in the Korean language as International Publication No. WO 2019/203462 on Oct. 24, 2019.

TECHNICAL FIELD

The present invention relates to a firing cartridge, and more particularly, to a firing cartridge in which multiple slit grooves are formed in lateral portions positioned between an upper end portion and a lower end portion, and solid fuel cell electrodes are inserted into the slit grooves, such that the number of cells, which may be fired at the same time, is increased, and thus productivity of a solid fuel cell may be improved.

BACKGROUND ART

Recently, with the depletion of the existing energy resources such as petroleum or coal, there is an increasing interest in alternative energy which may be substituted for the existing energy resources. A unit cell has attracted attention as one of the alternative energy resources, and particularly, the unit cell has an advantage in that the unit cell has high efficiency, emits no pollutant, and provides plentiful fuel, such that researches on the unit cell are being actively conducted.

In general, the unit cell has an air electrode and a fuel electrode which are formed at both sides of an electrolyte, respectively, the fuel electrode is configured as an anode, the air electrode is configured as a cathode, fuel is oxidized when fuel is supplied to the fuel electrode such that electrons are emitted through an external circuit, and the air electrode receives the electrons from the external circuit when oxygen is supplied to the air electrode such that the oxygen is reduced into oxygen ions. The reduced oxygen ions move to the fuel electrode through the electrolyte, react with the oxidized fuel, and produce water.

A stack refers to a structure which is made by connecting end cells of the solid oxide unit cells among such unit cells to have a high capacity, and the stack is used for a solid oxide fuel cell.

Here, in order to produce the solid oxide fuel cell, a process of printing positive electrodes on solid fuel cells, positioning one unit cell on a ceramic setter, installing four edge supports, disposing another ceramic setter on the four edge supports, and then disposing another unit cell on the setter is repeatedly performed in order to fire the multiple unit cells at the same time.

The ceramic firing setter in the related art has a predetermined thickness or more with respect to the unit cell for a solid fuel cell in order to easily stack the unit cells, such that the unit cells for a solid fuel cell may be stably stacked, and thus the unit cells may be fired at the same time.

However, because it is necessary to use the ceramic firing setter in the related art having an area larger than a size of the unit cell for a solid fuel cell, there is a problem in that the number of unit cells for a solid fuel cell, which may be fired at the same time, is restricted.

In addition, in the case of the ceramic firing setter in the related art, because it is necessary to repeat the process of positioning one unit cell on one ceramic setter, installing the four edge supports, and then disposing another ceramic setter on the four edge supports, there are problems in that a large amount of working time is taken, and particularly, productivity of the solid fuel cell deteriorates.

DETAILED DESCRIPTION OF THE INVENTION

Technical Problem

An object of the present invention is to provide a firing cartridge in which multiple slit grooves are formed in lateral portions, and multiple solid fuel cell electrodes are inserted into the multiple slit grooves, such that the number of unit cells for a solid fuel cell, which may be fired at the same time, may be increased.

In addition, an object according to an exemplary embodiment of the present invention is to provide a firing cartridge in which unit cells for a solid fuel cell are accommodated in multiple slit grooves formed in lateral portions, such that working time taken to fire the unit cells for a solid fuel cell may be reduced, and productivity of the solid fuel cell may be improved.

Technical Solution

A firing cartridge according to the present invention includes: an upper end portion; lateral portions which are disposed at both sides of the upper end portion, respectively; and a lower end portion which is connected to the lateral portions and disposed in parallel with the upper end portion, in which multiple slit grooves, which accommodate unit cells for a solid fuel cell, are symmetrically formed in the lateral portions.

According to one exemplary embodiment, one or more solid fuel cell electrodes may be inserted into the slit grooves.

According to one exemplary embodiment, the multiple slit grooves may be formed in the lateral portions so as to be spaced apart from one another.

According to one exemplary embodiment, spacing distances between the multiple slit grooves may be equal to one another.

According to one exemplary embodiment, each of the upper end portion and the lower end portion may be formed in the form of a quadrangular frame opened at a center thereof.

According to one exemplary embodiment, the upper end portion, the lower end portion, and the lateral portions may be made of a ceramic material.

According to one exemplary embodiment, the firing cartridge may further include a support member which is made of a ceramic material, is connected to the upper end portion and the lower end portion so as to be perpendicular to the upper end portion and the lower end portion, and has the same height as the lateral portions.

Advantageous Effects

According to one aspect of the present invention, the multiple slit grooves are formed in the lateral portions, and the multiple solid fuel cell electrodes are inserted into the multiple slit grooves, such that the number of unit cells for a solid fuel cell, which may be fired at the same time, may be increased.

In particular, the multiple unit cells for a solid fuel cell are installed in the multiple slit grooves formed in the lateral portions, such that working time taken to fire the unit cells for a solid fuel cell may be reduced, and productivity of the solid fuel cell may be improved.

BEST MODE

Figure 1:
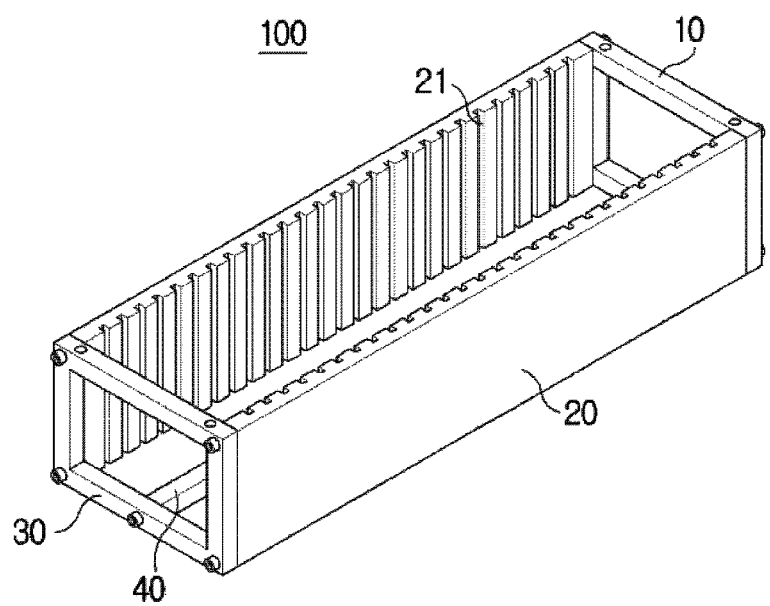
FIG. 1 is a perspective view schematically illustrating a structure of a firing cartridge 100 according to an exemplary embodiment of the present invention.

Hereinafter, the present invention will be described in detail with reference to the accompanying drawings. Here, repeated descriptions and detailed descriptions of publicly known functions and configurations will be omitted so as to avoid unnecessarily obscuring the subject matter of the present invention. Exemplary embodiments of the present invention are provided to completely explain the present invention to a person with ordinary skill in the art. Therefore, shapes and sizes of elements illustrated in the drawings may be exaggerated for a more apparent description.

Throughout the specification, unless explicitly described to the contrary, the word "comprise" or "include" and variations, such as "comprises", "comprising", "includes" or "including", will be understood to imply the inclusion of stated constituent elements, not the exclusion of any other constituent elements.

Hereinafter, exemplary embodiments are proposed to help understand the present invention. However, the following exemplary embodiments are provided just for more easily understanding the present invention, and the contents of the present invention are not limited by the exemplary embodiments.

<Firing Cartridge>

Figure 2:
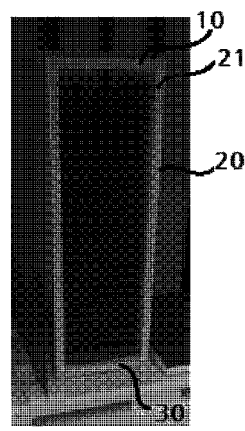
FIG. 2 is a view schematically illustrating a state in which unit cells for a solid fuel cell are inserted into slit grooves 21 illustrated in FIG. 1.

FIG. 1 is a perspective view schematically illustrating a structure of a firing cartridge 100 according to an exemplary embodiment of the present invention, and FIG. 2 is a view schematically illustrating a state in which unit cells for a solid fuel cell are inserted into slit grooves 21 of the firing cartridge 100 illustrated in FIG. 1.

The firing cartridge 100 according to the exemplary embodiment of the present invention may include an upper end portion 10, lateral portions 20 which are disposed at both sides of the upper end portion 10, respectively, and a lower end portion 30 which is connected to the lateral portions 20 and disposed in parallel with the upper end portion 10.

In this case, multiple slit grooves 21, which may accommodate unit cells for a solid fuel cell, may be symmetrically formed in the lateral portions 20. The upper end portion 10, the lateral portions 20, and the lower end portion 30 of the firing cartridge 100 may be made of a ceramic material.

In addition, one or more solid fuel cell electrodes may be inserted into the multiple slit grooves 21.

First, the upper end portion 10 may be formed in the form of a quadrangular frame opened at a center thereof. A thickness of the upper end portion 10 may be 0.1 cm to 10 cm, and more particularly, 1 cm to 8 cm.

If the thickness of the upper end portion 10 is less than 0.1 cm, there may be a problem in that durability of the firing cartridge 100 deteriorates.

Meanwhile, if the thickness of the upper end portion 10 is more than 10 cm, a weight of the upper end portion 10 is increased. For this reason, the lateral portions 20 to be described below cannot support the weight of the upper end portion 10, which may cause a problem in that the firing cartridge 100 is damaged.

Next, the lateral portions 20 may be disposed at both sides of the upper end portion 10, respectively. Here, both sides of the upper end portion 10 are two edges having a short length at an upper side of the upper end portion 10. The lateral portions 20 are disposed in parallel with each other and connected to both sides of the upper end portion 10.

A length of one edge at an upper side of each of the lateral portions 20 may be equal to a length of one edge of the upper end portion 10. A longest edge of each of the lateral portions 20 may have a length equal to a height of the firing cartridge 100. Here, the edges of the upper end portion 10 and the edges of the lateral portions 20 may be line segments that define boundaries between the portions.

A thickness of the lateral portion 20 may be 0.1 cm to 10 cm, and more particularly, 1 cm to 8 cm.

If the thickness of the lateral portions 20 is less than 0.1 cm, there may be a problem in that durability and stability of the firing cartridge 100 deteriorate.

Meanwhile, if the thickness of the lateral portions 20 is more than 10 cm, a weight of the lateral portions 20 is increased. For this reason, the lower end portion 30 to be described below cannot support the weight of the lateral portions 20, which may cause a problem in that the firing cartridge 100 is damaged.

For example, in a case in which a length of one edge at the upper side of the upper end portion 10 is 15 cm, a length of one edge at the upper side of the lateral portion 20 may also be 15 cm, and a thickness of the lateral portion 20 may be 5 cm.

Here, the lateral portions 20 may be connected to the upper end portion 10 by one of threaded connection, interference fit, and fastening.

The multiple slit grooves 21 may be symmetrically formed in the lateral portions 20, and the multiple slit grooves 21 may be formed in the lateral portions 20 so as to be spaced apart from one another.

Spacing distances between the multiple slit grooves 21 may be equal to one another. In this case, the spacing distance may be 100 μm to 3 cm, and more particularly, 1 mm to 1 cm.

If the spacing distance between the multiple slit grooves 21 is less than 100 μm, the unit cells for a solid fuel cell, which are inserted into the slit grooves 21, respectively, come into close contact with one another, which may cause a problem in that the unit cells for a solid fuel cell are damaged.

Meanwhile, if the spacing distance between the multiple slit grooves 21 is more than 3 cm, the number of unit cells for a solid fuel cell, which are stacked by being inserted into the slit grooves 21, is decreased, and thus the number of unit cells, which may be fired at the same time, is decreased, and as a result, there may be a problem in that productivity of the solid fuel cell deteriorates.

For example, the multiple slit grooves 21 may be formed in the lateral portions 20 while having the same spacing distance of 1 cm, and solid fuel cell electrodes may be accommodated in the multiple slit grooves 21, respectively.

Since the multiple slit grooves 21 are formed in the lateral portions 20, and the multiple solid fuel cell electrodes are inserted into the slit grooves 21, respectively, the number of unit cells for a solid fuel cell, which may be fired at the same time, may be increased.

In particular, since the multiple unit cells for a solid fuel cell are installed in the multiple slit grooves 21 formed in the lateral portions 20, working time taken to fire the unit cells for a solid fuel cell may be reduced, and productivity of the solid fuel cell may be improved.

The lower end portion 30 may be formed in the form of a quadrangular frame opened at a center thereof. A thickness of the lower end portion 30 may be 0.1 cm to 10 cm, and more particularly, 1 cm to 8 cm.

If the thickness of the lower end portion 30 is less than 0.1 cm, the lower end portion 30 cannot support the weight of the upper end portion 10 and the weight of the lateral portions 20, which may cause a problem in that durability of the firing cartridge 100 deteriorates. Meanwhile, if the thickness of the lower end portion 30 is more than 10 cm, there may be a problem in that overall production costs of the firing cartridge 100 are increased.

In addition, the lower end portion 30 may be connected to the lateral portions 20 by one of threaded connection, interference fit, and fastening. The upper end portion 10 and the lower end portion 30 may have the same shape and the same size.

The firing cartridge 100 may further include a support member 40 which is made of a ceramic material, is connected to the upper end portion 10 and the lower end portion 30 so as to be perpendicular to the upper end portion 10 and the lower end portion 30, and has the same height as the lateral portions 20.

The support member 40 has a height equal to the length of the longest edge of the lateral portion 20 connected to the upper end portion 10, and the support member 40 may connect the upper end portion 10 and the lower end portion 30.

The support member 40 may be connected to the upper end portion 10 and the lower end portion 30 by one of threaded connection, interference fit, and fastening.

Since the support member 40 connects and supports the upper end portion 10 and the lower end portion 30, durability of the firing cartridge 100 may be improved.

In addition, the support member 40 supports the multiple unit cells for a solid fuel cell, which are inserted into the multiple slit grooves 21 in the lateral portions 20, so that the multiple unit cells are not withdrawn to the outside, and as a result, stability of the firing cartridge 100 may be improved.

While the present invention has been described above with reference to the exemplary embodiments, it may be understood by those skilled in the art that the present invention may be variously modified and changed without departing from the spirit and scope of the present invention disclosed in the claims.

What is claimed is:

1. A firing cartridge comprising:
   an upper end portion;
   first and second lateral portions at opposing sides of the upper end portion, the first lateral portion comprising a first surface that comprises a plurality of first grooves, and the second lateral portion comprising a second surface facing the first surface of the first lateral portion, wherein the second surface of the second lateral portion comprises a plurality of second grooves; and
   a lower end portion connected to the first and second lateral portions, the lower end portion being parallel to the upper end portion,
   wherein the plurality of first grooves and the plurality of second grooves are arranged symmetrically, and a pair comprising one of the plurality of first grooves and one of the second grooves is configured to hold a unit cell for a solid fuel cell.

2. The firing cartridge of claim 1, wherein the pair comprises a plurality of pairs that are configured to hold a plurality of unit cells for the solid fuel cell, respectively.

3. The firing cartridge of claim 1, wherein the plurality of first grooves are spaced apart from one another, and the plurality of second grooves are spaced apart from one another.

4. The firing cartridge of claim 1, wherein the plurality of first grooves are spaced apart from one another by a uniform distance, and the plurality of second grooves are spaced apart from one another by the uniform distance.

5. The firing cartridge of claim 1, wherein the upper end portion and the lower end portion each have a quadrangular shape comprising an opening at a center thereof.

6. The firing cartridge of claim 1, wherein the upper end portion, the lower end portion, and the first and second lateral portions each comprise a ceramic material.

7. The firing cartridge of claim 1, further comprising:
   a support comprising a ceramic material, the support being connected to both the upper end portion and the lower end portion and having a height equal to a height of each of the first and second lateral portions.

8. The firing cartridge of claim 1, wherein the upper end portion is spaced apart from the lower end portion in a vertical direction, and
   wherein the plurality of first grooves are spaced apart from one another in the vertical direction, and the plurality of second grooves are spaced apart from one another in the vertical direction.

9. The firing cartridge of claim 8, wherein each of the upper end portion and the lower end portion has a thickness in the vertical direction in a range of from 0.1 cm to 10 cm.

10. The firing cartridge of claim 8, wherein each of the upper end portion and the lower end portion has a thickness in the vertical direction in a range of from 1 cm to 8 cm.

11. The firing cartridge of claim 8, wherein each of the first and second lateral portions has a thickness in a horizontal direction in a range of from 0.1 cm to 10 cm, and the horizontal direction is perpendicular to the vertical direction.

12. The firing cartridge of claim 8, wherein each of the first and second lateral portions has a thickness in a horizontal direction in a range of from 1 cm to 8 cm, and the horizontal direction is perpendicular to the vertical direction.

13. The firing cartridge of claim 4, wherein the uniform distance is in a range of from 100 μm to 3 cm.

14. The firing cartridge of claim 4, wherein the uniform distance is in a range of from 1 mm to 1 cm.

15. The firing cartridge of claim 5, wherein the opening of the upper end portion extends through the upper end portion in a thickness direction thereof, and the opening of the lower end portion extends through the lower end portion in a thickness direction thereof.

16. The firing cartridge of claim 7, wherein the upper end portion is spaced apart from the lower end portion in a vertical direction, and the support extends in the vertical direction.

* * * * *